United States Patent
Bitauld et al.

(10) Patent No.: US 10,367,638 B2
(45) Date of Patent: Jul. 30, 2019

(54) METHOD AND APPARATUS FOR QUANTUM CRYPTOGRAPHY

(71) Applicant: Nokia Technologies Oy, Espoo (FI)

(72) Inventors: David Bitauld, Cambridge (GB); Antti Niskanen, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/101,509

(22) PCT Filed: Dec. 16, 2013

(86) PCT No.: PCT/IB2013/060972
§ 371 (c)(1),
(2) Date: Jun. 3, 2016

(87) PCT Pub. No.: WO2015/092479
PCT Pub. Date: Jun. 25, 2015

(65) Prior Publication Data
US 2017/0019252 A1 Jan. 19, 2017

(51) Int. Cl.
*H04B 10/70* (2013.01)
*G02F 1/35* (2006.01)
*H04L 9/08* (2006.01)

(52) U.S. Cl.
CPC ............ *H04L 9/0852* (2013.01); *G02F 1/353* (2013.01); *H04B 10/70* (2013.01); *H04L 2209/34* (2013.01)

(58) Field of Classification Search
CPC ..... G02F 1/353; H04L 9/0852; H04L 9/0858; H04L 2209/34; H04B 10/70
See application file for complete search history.

(56) References Cited

U.S. PATENT DOCUMENTS

| | | | | |
|---|---|---|---|---|
| 7,202,511 | B2* | 4/2007 | Stapelbroek | H01L 31/09 257/10 |
| 7,555,127 | B2* | 6/2009 | Nambu | H04L 9/0852 380/256 |
| 8,054,976 | B2 | 11/2011 | Harrison et al. | |
| 9,258,114 | B2* | 2/2016 | Jezewski | H04L 9/0852 |

(Continued)

FOREIGN PATENT DOCUMENTS

| CN | 101204034 A | 6/2008 |
|---|---|---|
| CN | 102368705 A | 3/2012 |

(Continued)

OTHER PUBLICATIONS

International Search Report and Written Opinion received for corresponding Patent Cooperation Treaty Application No. PCT/IB2013/060972, dated Sep. 2, 2014, 13 pages.

(Continued)

*Primary Examiner* — Khang Do
(74) *Attorney, Agent, or Firm* — Alston & Bird LLP

(57) ABSTRACT

Methods and apparatus for use in quantum cryptographic applications are disclosed. An optical signal having a first wavelength is encoded for quantum cryptography at a stage where the optical signal is on at least two signal paths. The wavelength of the encoded optical signal on the at least two signal paths is converted to a second wavelength before the optical signal is encoded for transmission. Encoding for transmission is applied to the optical signal on the second wavelength.

20 Claims, 6 Drawing Sheets

(56) References Cited

U.S. PATENT DOCUMENTS

| | | | |
|---|---|---|---|
| 2006/0056630 A1* | 3/2006 | Zimmer | B82Y 10/00 |
| | | | 380/256 |
| 2006/0222180 A1 | 10/2006 | Elliott | |
| 2006/0274401 A1* | 12/2006 | Inoue | G02F 1/395 |
| | | | 359/326 |
| 2007/0065155 A1 | 3/2007 | Luo et al. | |
| 2007/0228373 A1 | 10/2007 | Takemoto et al. | |
| 2008/0050126 A1 | 2/2008 | Shapiro et al. | |
| 2008/0063015 A1 | 3/2008 | Trifonov et al. | |
| 2008/0175385 A1 | 7/2008 | Lee et al. | |
| 2009/0022322 A1* | 1/2009 | Trifonov | H04B 10/70 |
| | | | 380/278 |
| 2009/0034737 A1* | 2/2009 | Trifonov | H04B 10/85 |
| | | | 380/278 |
| 2010/0079833 A1 | 4/2010 | Langford et al. | |
| 2011/0150226 A1* | 6/2011 | Cho | H04B 10/70 |
| | | | 380/278 |
| 2012/0230493 A1* | 9/2012 | Bowes | H04L 9/0858 |
| | | | 380/278 |
| 2013/0016835 A1 | 1/2013 | Zbinden et al. | |
| 2013/0308956 A1* | 11/2013 | Meyers | H04B 10/11 |
| | | | 398/130 |
| 2015/0249537 A1 | 9/2015 | Wabnig et al. | |

FOREIGN PATENT DOCUMENTS

| | | |
|---|---|---|
| CN | 104737491 A | 6/2015 |
| WO | 2009/017579 A1 | 2/2009 |
| WO | 2009110662 | 9/2009 |
| WO | 2013/179094 A1 | 12/2013 |
| WO | WO 2013/179094 A1 | 12/2013 |
| WO | 2014060793 | 4/2014 |

OTHER PUBLICATIONS

Agha et al., "A Chip-scale, Telecommunications-band Frequency Conversion Interface for Quantum Emitters", Optics Express, vol. 21, No. 18, Sep. 6, 2013, 11 pages.

Kielpinski et al., "Quantum Optical Waveform Conversion", Physical Review Letters, vol. 106, 2011, 10 pages.

Takesue et al., "Differential Phase Shift Quantum Key Distribution Experiment Over 105 km Fibre", New Journal of Physics, vol. 7, Nov. 18, 2005, pp. 1-12.

Extended European Search Report received for corresponding European Patent Application No. 13899487.6, dated Aug. 28, 2017, 8 pages.

Office Action for Chinese Application No. 201380081631.4 dated Aug. 3, 2018, 31 pages.

Office Action for European Application No. 13 899 487.6 dated Nov. 15, 2018, 7 pages.

Fernandez-Gonzalvo, X. et al., *Quantum Frequency Conversion of Quantum Memory Compatible Photons to Telecommunication Wavelengths*, Optics Express (Aug. 12, 2013) 19473-19478.

Zaske, S. et al., *Visible-to-Telecom Quantum Frequency Conversion of Light From a Single Quantum Emitter*, Physical Review Letters, PRL 109 (Oct. 2012) 147404-1-147404-5.

\* cited by examiner

Two beams propagating in parallel

Two beams propagating in parallel

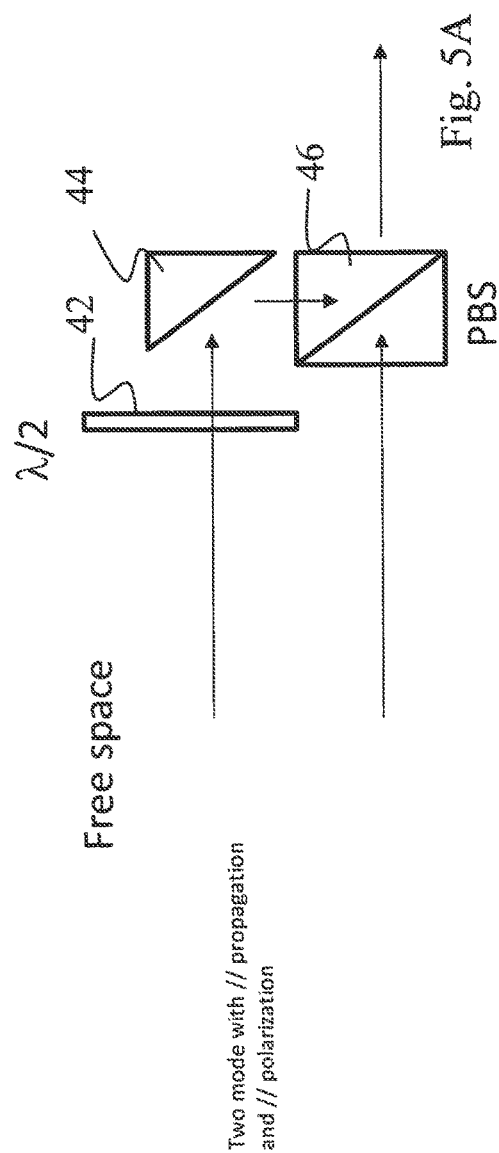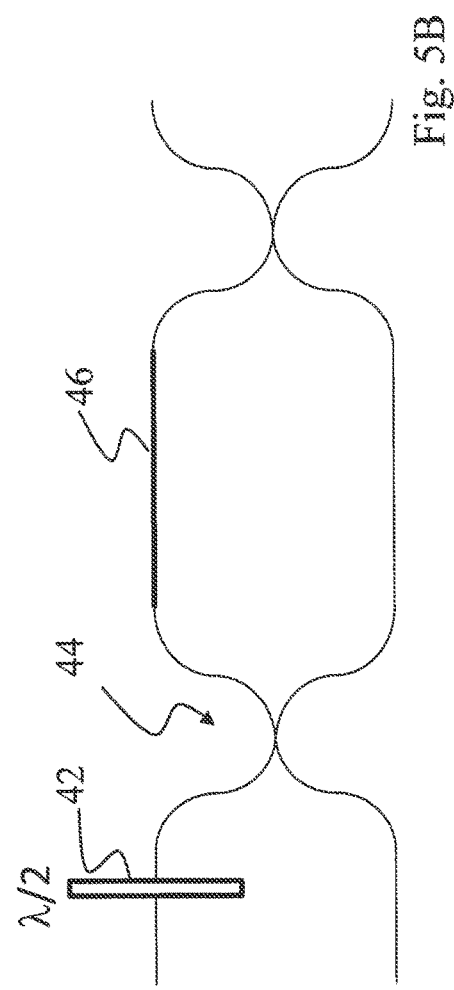

METHOD AND APPARATUS FOR QUANTUM CRYPTOGRAPHY

RELATED APPLICATION

This application was originally filed as PCT Application No. PCT/IB2013/060972 filed Dec. 16, 2013.

This disclosure relates to use of quantum cryptography for securing communications.

Communications can provided between two or more devices such as fixed and/or mobile communication devices, access point devices such as base stations, servers, machine type devices, and so on. The communications may occur over fixed or wireless connections.

Transmissions between communicating devices and privacy of the communicating parties may need to be secured. For example, communications can be vulnerable to eavesdropping or other attacks by hackers. Examples of applications that typically rely on secure transactions over the Internet or other data communication networks include banking, shopping and other financial transactions, email, corporate communications, cloud computing and so on.

Devices such as personal computers, servers and other devices associated with a communications link have traditionally been mostly fixed and connected through cables and/or fibre optics. However, the number of mobile devices that communicate over wireless interfaces is increasing. Also, the volume of sensitive information communicated between various devices is increasing, in part because of various new applications requiring safe communications.

Current approaches to protect data are based on cryptographic schemes that rely on computational difficulty to solve mathematical problems. Computers are increasingly powerful in solving problems and hence the complexity of the encryption has had to be increased to keep up with possibilities for security breaches. New ways of securing communications between parties are also looked at. Encryption with the help of quantum key distribution (QKD) is considered as one possibility for improving security. QKD is seen as a promising solution e.g. for public key distribution to exchange secret keys between authorized parties. The QKD is based on the idea that key bits are encoded in quantum systems and exchanged between the parties. QKD enables the parties to detect the presence of a third party trying to gain knowledge of the key because an attempt of eavesdropping a quantum system in general disturbs the system. Because of this a third party trying to measure the signal introduces detectable anomalies. In QKD the trust can thus be placed on the laws of physics and nature rather than increased complexity and computing power. In quantum glyptography parties are provided with photon detectors. The efficiency of the detectors depends on the wavelength of the received optical signal.

It is noted that the issues discussed in this specification are not limited to any particular communication environments and apparatus but may occur in any context where communications are secured based on quantum cryptography.

Embodiments of the invention aim to address one or several of the above issues.

In accordance with an embodiment there is provided a method, comprising encoding an optical signal having a first wavelength for quantum cryptography at stage where the optical signal is on at least two signal paths, converting the wavelength of the encoded optical signal on the at least two signal paths to a second wavelength before the optical signal is encoded for transmission, and encoding the optical signal having the second wavelength for transmission.

In accordance with an embodiment there is provided apparatus for processing optical signals for quantum cryptography, comprising a quantum cryptography encoder configured to encode the optical signal having a first wavelength and arranged on at least two signal paths, a wavelength converter configured to convert the wavelength of the encoded optical signal on the at least two signal paths to a second wavelength before the optical signal is encoded for transmission, and a transmission encoder configured to encode the optical signal for transmission.

In accordance with a more specific aspect the converting comprises shortening the wavelength of the encoded optical signal. The quantum cryptography encoder may be configured to operate efficiently in a wavelength that is within range of 0.9 to 2 µm and/or the transmission encoder is configured to operate efficiently in a wavelength that is less than 1 µm.

Wavelength of an optical signal may be converted for quantum key distribution.

The encoding for transmission may comprise one of polarization encoding, time bin-phase encoding, spatial mode encoding and angular momentum encoding.

Optical signals on at least two signal paths may have the same polarization when subjected to wavelength conversion.

Free space mode conversion and polarization rotation may be provided before the wavelength conversion.

Wavelength conversion may be provided by a single chip or a single crystal.

Optical signals may be attenuated by the converting for a faint pulse based quantum key distribution. A quantum key distribution emitter on a hybrid platform comprising heterogeneous chips for the encoding and converting stages may be provided.

An apparatus comprising an, integrated indium phosphide based chip or a silicon based chip configured to provide the quantum cryptography encoder, at least one light source and at least one lens may also be provided.

A device such as a mobile communication device, a base station, a machine type terminal or another node with communication capability can be arranged to implement the embodiments.

A computer program comprising program code means adapted to perform the herein described methods may also be provided. In accordance with further embodiments apparatus and/or computer program product that can be embodied on a computer readable medium for providing at least one of the above methods is provided.

It should be appreciated that any feature of any aspect may be combined with any other feature of any other aspect.

Embodiments will now be described in further detail, by way of example only, with reference to the following examples and accompanying drawings, in which:

FIGS. 3 to 5 show diagrams of exemplifying components for the blocks of FIG. 2;

Mobile devices are an example of devices where secure communications can be provided based on quantum cryptography. A mobile device of a user for communications with e.g. a base station or another mobile device is often referred to as user equipment (UE) or terminal. A mobile device for embodying the below explained examples may be provided by any device capable of sending signals to and/or receiving wireless signals on a channel. The mobile device is also provided with apparatus for communication on an optical channel. Non-limiting examples of mobile devices include a mobile station (MS) such as a mobile phone or what is known as a 'smart phone', a portable computer such as a laptop, tablet or a personal data assistant (PDA) provided with wireless communication capabilities, or any combinations of these or the like. An appropriate mobile device is provided with at least one data processing entity, at least one memory, and other possible components for use in software and hardware aided execution of tasks it is designed to perform, including control of communications with other parties and features relating to secure communications. The data processing, storage and other relevant control apparatus can be provided on an appropriate circuit board and/or in chipsets.

A quantum key distribution (QKD) system can be used in securing communications. Quantum key distribution (QKD) can be used with optical transmission channels, for example free space (particularly suitable for mobile telecommunications), waveguides and optical fibres. A possible use case is a mobile device establishing a shared key with a stationary terminal. Implementations of quantum key distribution schemes rely on sending a low number of photons, on average less than a single photon per pulse between two terminals. Quantum cryptography as such is known and several companies offer fibre-based quantum key distribution devices. Cryptographic schemes that use properties of quantum mechanical systems to distribute a secure key are considered as providing high levels of security. For example, the current belief is that even a powerful eavesdropper who would only be limited by the laws of physics should not be able to compromise the security of the scheme.

Figure 1:
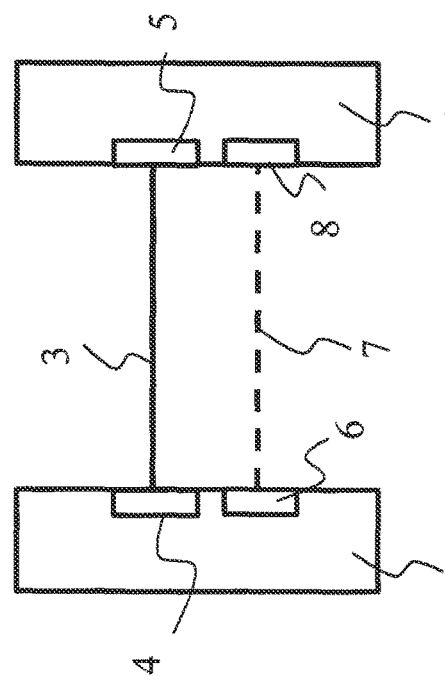
FIG. 1 shows a schematic diagram of two devices capable of wireless communications.

A quantum key distribution scheme can be provided between sender and recipient devices of keys. FIG. 1 shows a sender device 1 and a recipient device 2. Terminal 1 is a qubit sender and terminal 2 is a receiver. In accordance with an embodiment terminal 1 comprises a mobile device, for example a mobile phone or a smartphone, a laptop, a notebook, a tablet computer and so forth. Terminal 2 comprises a stationary node, for example a base station of a cellular system or a local network system or a machine type terminal. A radio frequency (RF) wireless link 3 can provided between devices 1 and 2. Both devices can be provided with a communications subsystem 4 and 5, respectively for the wireless communications, for example with appropriate radio apparatus to facilitate wireless communications. It is noted that a communication channel between devices 1 and 2 can also be provided based on other technologies, such as via an optical link.

Distribution of keys for securing communications between devices 1 and 2 is based on sending of photons between the devices over an optical link 7, shown by a dashed line. The key distribution is based on sending photons, and in practice, faint pulses containing a photon number smaller than one in average e.g. from terminal 1 to terminal 2. The principles described herein can be applied to most of the QKD protocols based on faint pulses in fibre or free space. Apparatus 6 at device 1 for generating and emitting the photons can comprise an optical encoder adapted for encoding of random qubit states and emitting photons. Elements such as control electronics for creating electrical pulses needed to emit photons, a (quantum) random number generator, and a processor apparatus for controlling these components may also be provided. The apparatus for optical encoding can be adapted to probabilistically convert light pulses emitted by the light sources into photons. At the receiving device 2 appropriate decoding and detector apparatus 8 is provided. Both devices can be configured to emit and detect photons. Control electronics adapted for processing detector outputs and record their time trace, a communications subsystem for the wireless communication, and a computer or processor for controlling the above components can also be provided.

Optical components for producing and transmitting optical signals (e.g. lasers, modulators, integrated optics on semiconductors) are widely available, reasonably well performing and priced for example at wavelengths in domains around 1.3 and 1.55 μm (microns). However, on the receiving side, while detectors exist that are good enough for classical communications at those wavelengths, single photon detectors required for quantum cryptography can be inefficient, noisy, bulky and/or expensive. The inventors have recognised that more efficient low-noise detectors are available for wavelengths below 1 micron. Integrated photonics can also be found at those wavelengths on dielectric platforms. Wavelength conversion can be provided to improve efficiency and/or address other issues. The implementation described below uses cross-polarized crystals in the case of polarization biased QKD uses a design that works with a crystal or a waveguide that requires relatively low peak intensities and provides good power efficiency.

Figure 2:
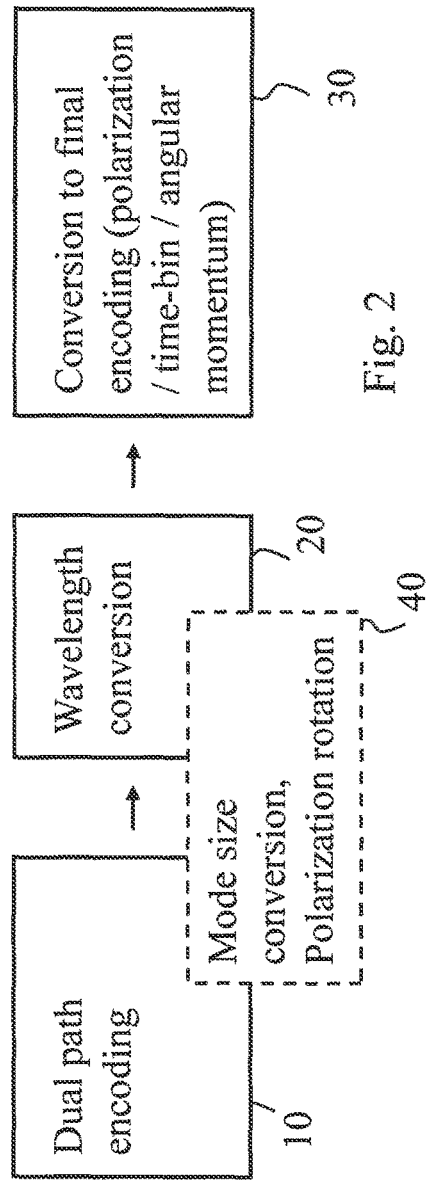
FIG. 2 shows a block diagram of an emitter of optical signals.

FIG. 2 discloses a block diagram illustrative of the principle of a possible wavelength conversion before transmission of encoded information on an optical interface in accordance with a quantum key distribution scheme. The embodiment aims to provide the advantages existing in two different wavelength ranges without unnecessarily compromising overall performance. This is based on recognition that there quantum cryptography systems have a stage where losses can be tolerated. Conversion in the emitting device 6 prior to transmission provides a freedom to adjust the wavelength to preferred technologies, either by up or down conversion. This can be used to address a mismatch between the wavelength at which encoding is efficient and the wavelength at which detection is efficient.

An emitter 6 can be composed of three main parts denoted by blocks 10, 20 and 30 in FIG. 2 for performing dual-path encoding, wavelength conversion and polarization encoding, respectively. More particularly, the first block 10 may include the light source(s) and dual rail encoding. Depending on the platform both of the components can be provided on a single chip. The optical wavelength of the signal output from the dual path encoder stage 10 is converted at 20 just before transmission thereof. This can be beneficial because at this stage conversion efficiency does not have to be very high but poor efficiency can be tolerated. In particular, even though wavelength conversion can be inefficient for low power light (low power light may be used e.g. for power saving reasons) the inventors have found this not to be problematic in the case of faint pulse-based quantum key distribution. Indeed, in those protocols, light needs to be attenuated anyway, and power is cut down by many orders of magnitude before transmission in order to reach single-photon-level power. The amount of photons produced by as such inefficient wavelength conversion is still more than enough for most applications. Conversion prior to transmission allows efficient encoding of the optical signal in a wavelength domain where components are widely available while also enabling use of detectors at the other party that are more efficient. Typically this would mean wavelengths below 1 micron level.

The wavelength conversion can be performed e.g. by techniques such as second harmonic generation (frequency doubling) or up-conversion with the help of a pump beam (sum frequency generation or four-wave mixing).

The wavelength conversion can be performed at a stage where the encoding is implemented on a dual-path. The conversion from dual-path encoding to e.g. polarization encoding is performed at block 30 after the wavelength conversion at 20. In practice it can be easier to perform wavelength conversion while all the light on the two rails or light paths has the same polarization. This is opposite to implementations where a cross-polarized thin crystal is necessary.

Two periodically poled waveguides can be used in parallel. According to a possibility a bulk crystal (periodically poled or not) with two collimated beams is used in parallel. This can be performed by a single-chip or a single crystal. A complete implementation of the QKD emitter can be done by a hybrid platform, i.e. different functionalities can be performed by different heterogeneous chips assembled together.

Figure 3:
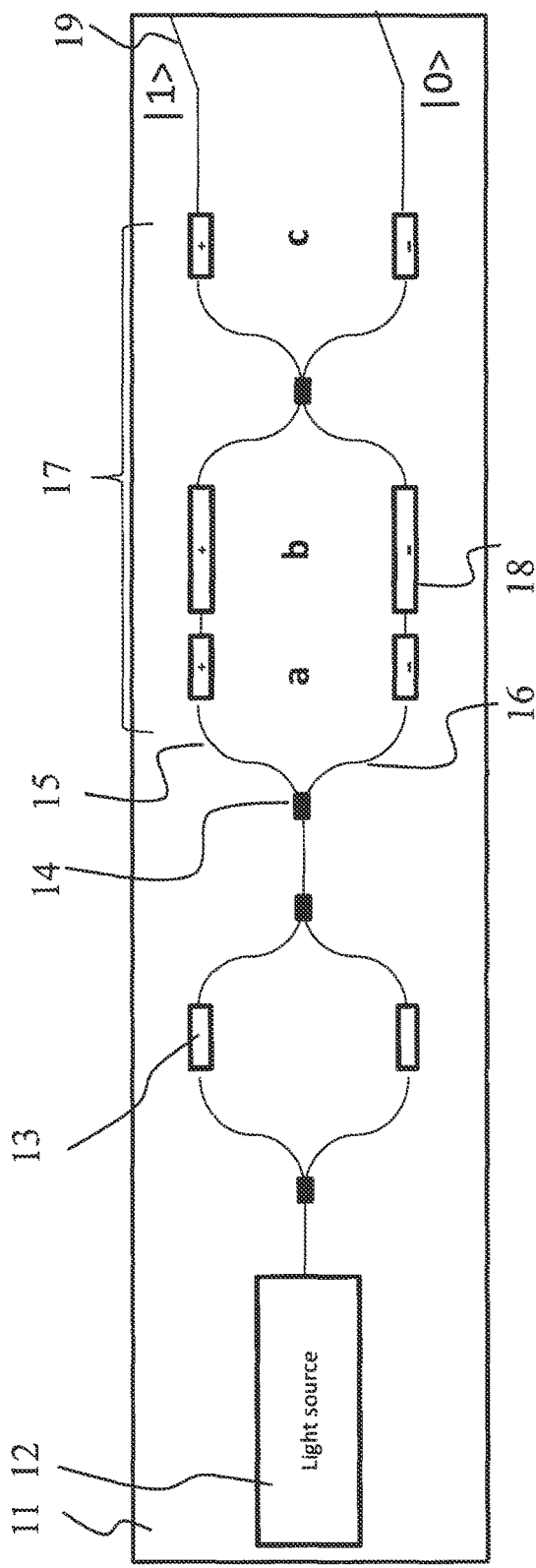

An example of a possible implementation of a chip with a light source and AM/PM modulation is shown in FIG. 3. In this example a light source 12 and dual rail encoding stage 16 are provided on an Indium Phosphide (InP) platform 11. The light source 12 can comprise e.g. a laser integrated in the chip 11. More than one light source may be provided. In order to maximize the subsequent wavelength conversion, a laser light source can be mode-locked in order to generate pulses at a repetition rate that is higher than the bit rate of the system. Light from the light source 12 is subjected to phase shift for intensity modulation. The state can be returned to zero and/or decoy state. For example, the light can be passed through a Mach-Zehnder interferometer with phase shifters 13 to modulate the intensity of the light source.

Beam splitters 14 are provided after the phase shift stage. The light on the two paths 15 and 16 is then dual path encoded at the phase shifter part 17. The phase shifter part 17 comprises three pairs a, b and c of phase shifters 18. An opposite voltage is applied to the top and bottom phase shifter of each pair. Depending on which of the phase shifter pairs is activated, light will come out at the angle outputs 19 via the top path 15 (corresponding to qbit |0>), the bottom path 16 (qbit |1>) or both paths with a controlled phase shift ($|0>+e^{i\phi}|1>$).

A truth table shown below the chip 11 shows bit encoding as a function of which phase shifter has a voltage applied.

Figure 4A:
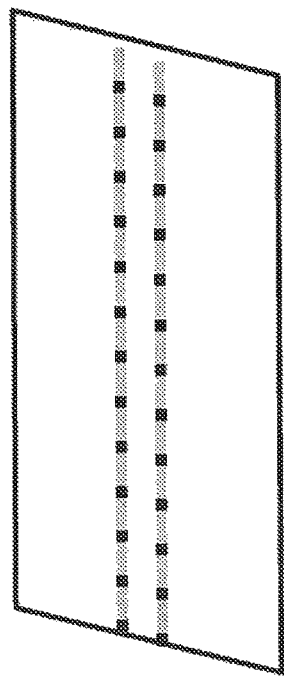
Figure 4B:
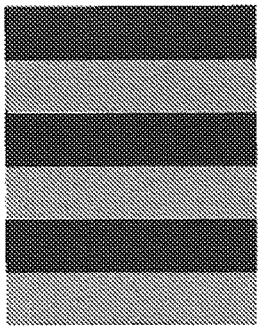
Figure 4C:

The second block 20 of FIG. 2 provides the wavelength conversion on the top and bottom paths at the same time. Some examples for possible wavelength converters are shown in FIGS. 4A to 4C. The wavelength conversion can be done in waveguides (e.g. periodically Poled Lithium Niobate (PPLN) or Magnesium Oxide (MgO) waveguides) in an unguided periodically poled crystal or in bulk (angle-phase-matched crystal). In quasi-phase matching the frequencies involved are not constantly locked in phase with each other but the crystal axis is flipped at a regular interval. A commonly used technique for creating quasi-phase-matched crystals is periodic poling. Hence, these crystals are called periodically poled. This results in the polarization response of the crystal to be shifted back in phase with the pump beam by reversing the nonlinear susceptibility. Quasi-phase-matching allows a positive net flow of energy from a pump frequency to signal and idler frequencies by creating a periodic structure in a nonlinear medium. FIG. 4A shows the principle of quasi-phase matched waveguide pair. FIG. 4B shows a quasi-phase matched bulk crystal. FIG. 4C shows as an alternative an angle-phase matched bulk crystal.

The third block 30 of FIG. 2 converts the dual-path encoding into a final encoding for transmission. For example, polarization encoding, a time bin-phase encoding, spatial mode encoding (e.g. in few-mode fibers) or an angular momentum encoding can be provided at this stage. An example for the polarization encoding in free space arrangement is shown in FIG. 5A. In the example the polarization of one of the paths is rotated by 90 degrees at 44 and both paths are then combined at 46. This can be done in free space or in an integrated platform (e.g. silica or polymer) via an asymmetric Mach-Zehnder interferometer, at least one arm being birefringent. Time bin-phase encoding can also be done on the same type of platform with an asymmetric Mach-Zehnder. In this case one arm has a delay line for time shifting. FIG. 5B shows how the components 42, 44 and 46 may be provided on an integrated chip. The chip can be, for example a silica or polymer chip. The chips can be butt-coupled to each other when the modes and polarization between the parts is similar. Otherwise a free space mode conversion and polarization rotation might be necessary. This possibility is schematically illustrated by block 40 in FIG. 2.

Figure 6:
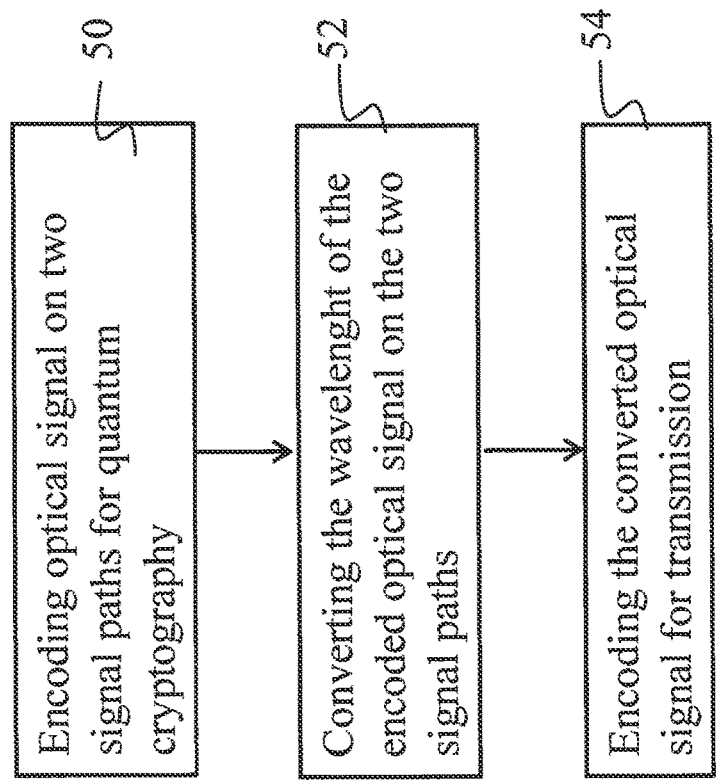
FIG. 6 is a flowchart for operation at a transmitter of optical signals.

FIG. 6 shows a flowchart in accordance with an embodiment for communications of photons by a sender device. An optical signal that is generated for carrying encoded information in accordance with a quantum cryptography scheme and divided into two paths has a first wavelength is input into an encoder and encoded at 50 for quantum cryptography while in the two paths. The wavelength of the encoded, optical signal in the two path stage is then converted to a second wavelength at 52. This is performed before the optical signal is encoded for transmission. Encoding of the optical signal now on the second wavelength for transmission then takes place at 54. At this stage the optical signal can be processed on a single path.

Figure 7:
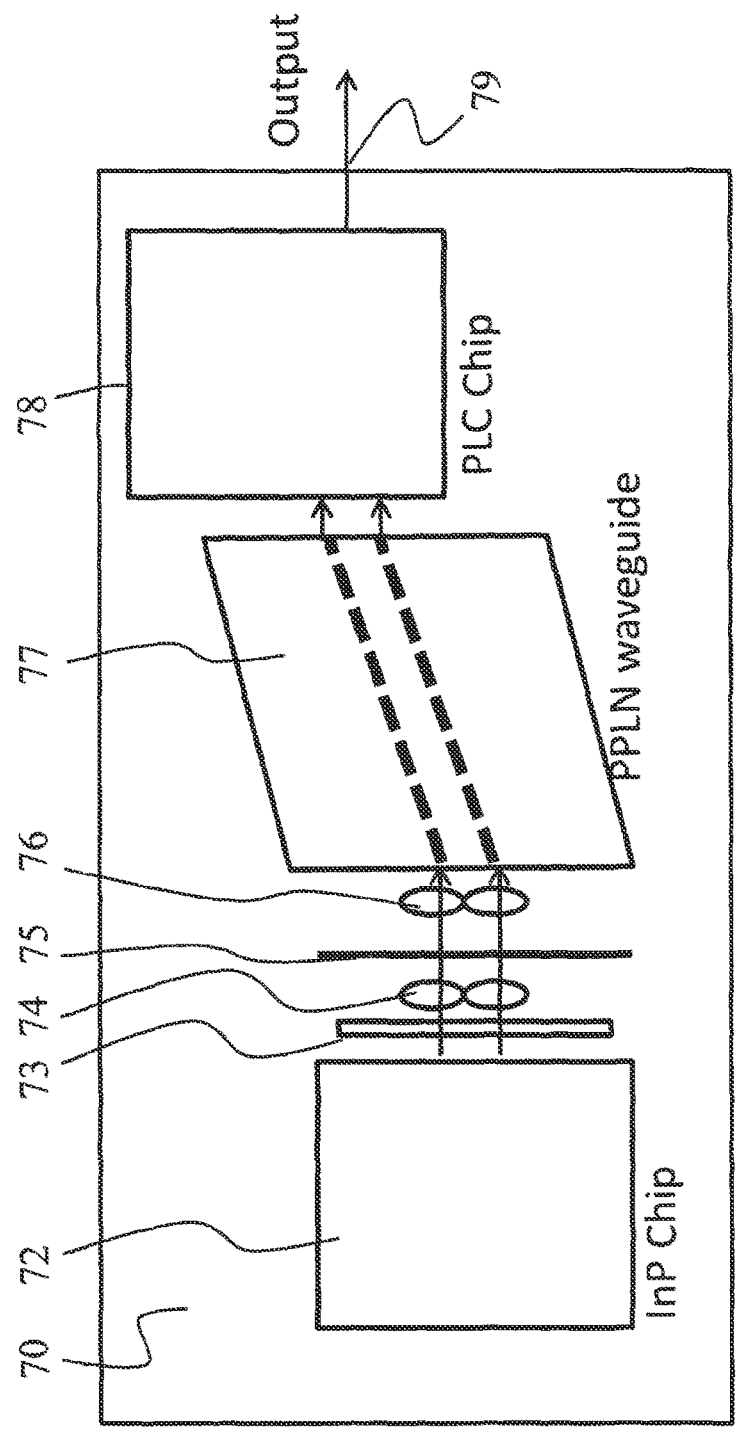
FIG. 7 shows en example of an emitter of optical signals for quantum cryptography on a temperature controlled substrate.

FIG. 7 shows a possible configuration of three chips on a temperature controlled common substrate 70. An Indium phosphide chip 72 produces two horizontally polarized output modes with dimensions ~0.5 µm×3 µm. These modes are converted into vertically polarized 8 µm×8 µm modes to be injected in the next chip 77. This is done with a combination of cylindrical lenses 73, 74 and spherical lenses 76 and a half wave plate 75. In the example the first cylindrical lens 73 provides vertical collimation and the second cylindrical lens 74 provides horizontal collimation. InP chips are anticipated to develop such that it is possible to integrate at least some of these elements in the chip.

The second chip 77 can be provided as a pair of periodically poled lithium niobate (PPLN) waveguides.

The third chip 78 can be a polymer, silica or silicon nitride planar lightwave circuit (PLC) with a miniature wave plate inserted along one of the paths.

The output 79 of this hybrid chip combination can be filtered to remove the pump wavelength and steered towards a QKD receiver.

The optical signal carries' the encoded information on the changed wavelength. The information is received and decoded by means of a detector apparatus suitable for use with the changed wavelength. The decoding can be made for example with dielectric integrated photonics circuits or any component suitable for the transmitted wavelength, for example shortened wavelengths less than 1.1 microns. Efficient single photon detectors are used to sense the presence of photons in each time bin defined by the expected arrival time of the faint pulse. QKD protocols can require the transmitter and receiver terminals to publicly exchange information and process their respective data in order to, obtain a secure key.

The herein described embodiments may be beneficial e.g. because the quantum cryptographic operations can be provided with a wider variety of readily available efficient components. By adjusting the wavelength at a stage where losses can be tolerated to desired technologies efficient, cheap and/or compact quantum cryptography based systems may be provided. In certain embodiments integrated photonics platforms such as Silicon on Insulator or Indium Phosphide, combined with the more mature Lithium Niobate, Silica-on-Silicon or polymer platforms can be used. It is also possible to use efficient and cheap single photon detectors, e.g. Silicon Avalanche Photodiodes.

Figure 8:
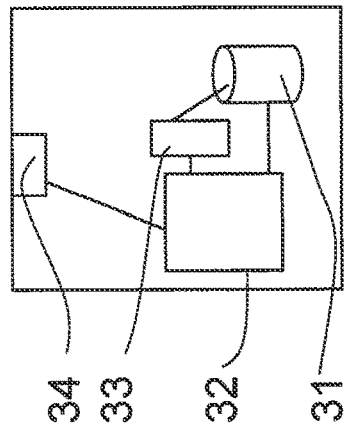
FIG. 8 shows an example of control apparatus.

Mobile devices, base stations and other communicating devices are typically controlled by at least one appropriate controller apparatus so as to enable operation thereof and control of wireless communications between the devices and/or the base station. The control apparatus can be interconnected with other control entities. FIG. 8 shows an example of a control apparatus capable of operating in accordance with the embodiments, for example to be coupled to and/or for controlling devices 1 and 2 of FIG. 1. The control apparatus can be configured to provide control functions in association with determination of various information, generation and communication of information between the various entities and/or control functions based on such information by means of the data processing facility in accordance with the certain embodiments described above. For this purpose the control apparatus comprises at least one memory 31, at least one data processing unit 32, 33 and an input/output interface 34. The control apparatus can be coupled to a receiver and/or transmitter of the relevant node via the interface. The control apparatus can be configured to execute an appropriate software code to provide the control functions.

According to an example appropriate apparatus or means are provided for processing optical signals for quantum cryptography, comprising quantum cryptography encoding means for encoding the optical signal having a first wavelength and arranged on at least two signal paths, wavelength conversion means for converting the wavelength of the encoded optical signal on the at least two signal paths to a second wavelength before the optical signal is encoded for transmission, and transmission encoder means for encoding the optical signal for transmission.

The required data processing apparatus, functions and circuitry at the relevant devices may be provided by means of one or more data processors and other hardware and software. The described functions may be provided by separate processors or by an integrated processor. The data processing apparatus may be of any type suitable to the local technical environment, and may include one or more of general purpose computers, special purpose computers, microprocessors, digital signal processors (DSPs), application specific integrated circuits (ASIC), gate level circuits and processors based on dual-core or multi-core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory, including appropriate types of random access memory (RAM) and read-only memory (ROM).

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, for example for controlling communications, user interface, and data processing, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD, and a cloud storage arrangement.

As used in this specification, the term circuitry refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that requires software or firmware for operation, even if the software or firmware is not physically present. This definition of circuitry applies to all uses of this term in this specification, including in any claims. As a further example, as used in this specification, the term circuitry also covers an implementation of merely a processor (or multiple processors) or portion of a processor and its (or their) accompanying software and/or firmware. The term circuitry also covers, for example and if applicable to the particular claim element, a baseband integrated circuit or applications processor integrated circuit for a mobile device.

It is noted that whilst embodiments have been described using a mobile communication device and mobile systems as examples, similar principles can be applied to any other system where security can be provided based on a quantum cryptography mechanism between communicating devices. For example, instead of communications between a mobile station and a base station or a machine type terminal communications may be provided between two mobile devices, or between two static or semi-static devices. For example, the principles can be applied where no fixed equipment is provided but a communication system is provided by means of a plurality of user equipment, for example in adhoc networks. The communications may also occur between fixedly located devices and over a medium enabling communications of optical signals, for example between devices communication via fibre optics. Therefore, although certain embodiments were described above by way of example with reference to certain exemplifying architectures for wireless networks, technologies and standards, embodiments may be applied to any other suitable forms of communication systems than those illustrated and described herein.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method, comprising:
encoding an optical signal having a first wavelength of greater than 1.3 micron for quantum cryptography at a stage where the optical signal is on at least two signal paths;
converting the first wavelength of the encoded optical signal, on the at least two signal paths, to a second wavelength of less than 1 micron by quasi-phase matching before the optical signal is encoded for transmission; and
encoding the optical signal having the second wavelength on the at least two signal paths for transmission.

2. A method according to claim 1, comprising shortening the wavelength of the encoded optical signal on the at least two signal paths.

3. A method according to claim 1, wherein the encoding for transmission comprises one of polarization encoding, time bin-phase encoding, spatial mode encoding and angular momentum encoding.

4. A method according to claim 1, wherein the optical signals on the at least two signal paths have the same polarization when subjected to the wavelength conversion.

5. A method according to claim 1, comprising free space mode conversion and polarization rotation before the wavelength conversion.

6. A method according to claim 1, comprising performing the wavelength conversion by a single chip or a single crystal.

7. A method according to claim 1, wherein the converting comprises converting the wavelength of an optical signal for quantum key distribution.

8. A method according to claim 7, comprising attenuating the optical signal having the second wavelength by the converting for a faint pulse based quantum key distribution.

9. A method according to claim 7, comprising providing a quantum key distribution emitter on a hybrid platform comprising heterogeneous chips for the encoding of the optical signal having the first wavelength for quantum cryptography and the converting the first wavelength of the encoded optical signal, on the at least two signal paths, to the second wavelength of less than 1 micron by quasi-phase matching before the optical signal is encoded for transmission.

10. An apparatus for processing optical signals for quantum cryptography, comprising:
a quantum cryptography encoder configured to encode an optical signal having a first wavelength of greater than about 1.3 micron and arranged on at least two signal paths;
a wavelength converter configured to convert the wavelength of the encoded optical signal, on the at least two signal paths, to a second wavelength of less than 1 micron by quasi-phase matching before the optical signal is encoded for transmission; and
a transmission encoder configured to encode the optical signal having the second wavelength on the at least two signal paths for transmission.

11. An apparatus according to claim 10, wherein the wavelength converter is configured to shorten the wavelength of the encoded optical signal arranged on the at least two signal paths.

12. An apparatus according to claim 10, wherein the quantum cryptography encoder is configured to operate efficiently in a wavelength that is within range of 0.9 to 2 µm and/or the transmission encoder is configured to operate efficiently in a wavelength that is less than 1 µm.

13. An apparatus according to claim 10, wherein the transmission encoder is configured to provide one of polarization encoding, time bin-phase encoding, spatial mode encoding and angular momentum encoding of the optical signal.

14. An apparatus according to claim 10, configured to provide free space mode conversion and/or polarization rotation before the wavelength conversion.

15. An apparatus according to claim 10, comprising two periodically poled waveguides in parallel, a periodically poled crystal or a bulk crystal for the wavelength conversion.

16. An apparatus according to claim 10, comprising a single chip or a single crystal for performing the wavelength conversion.

17. An apparatus according to claim 10, the apparatus being for faint pulse based quantum key distribution, wherein wavelength converter is configured to attenuate the optical signal.

18. An apparatus according to claim 17, comprising a quantum key distribution emitter provided on a hybrid platform comprising heterogeneous chips for the encoding of the optical signal having the first wavelength for quantum cryptography and the converting the first wavelength of the encoded optical signal, on the at least two signal paths, to the second wavelength of less than 1 micron by quasi-phase matching before the optical signal is encoded for transmission.

19. An apparatus according to claim 10, comprising an integrated indium phosphide based chip or a silicon based chip configured to provide the quantum cryptography encoder, at least one light source and at least one lens.

20. A non-transitory computer-readable memory medium encoded with instructions that, when executed by a computer, perform:
encoding an optical signal having a first wavelength of greater than 1.3 micron for quantum cryptography at a stage where the optical signal is on at least two signal paths;
converting the first wavelength of the encoded optical signal, on the at least two signal paths, to a second wavelength of less than 1 micron by quasi-phase matching before the optical signal is encoded for transmission; and
encoding the optical signal having the second wavelength on the at least two signal paths for transmission.

* * * * *